United States Patent [19]

Cook

[11] 4,188,441
[45] Feb. 12, 1980

[54] FLEXIBLE PACKAGING FILMS OF HIGH DENSITY POLYETHYLENE CAPABLE OF FORMING EASILY OPENABLE HEATSEALS

[75] Inventor: Stephen O. Cook, Mill Valley, Calif.

[73] Assignee: Crown Zellerbach Corporation, San Francisco, Calif.

[21] Appl. No.: 658,549

[22] Filed: Feb. 17, 1976

[51] Int. Cl.² .................. B32B 27/08; B32B 27/32
[52] U.S. Cl. ............................ 428/216; 428/337; 428/336; 428/339; 428/516; 428/520; 428/522; 525/496; 525/221
[58] Field of Search ............. 428/337, 338, 339, 500, 428/516, 517, 518, 519, 521, 221, 520, 523, 336; 427/407; 425/133.5

[56] References Cited

U.S. PATENT DOCUMENTS

| | | | |
|---|---|---|---|
| 3,264,272 | 8/1966 | Rees | 428/523 |
| 3,496,061 | 2/1970 | Freshour et al. | 428/516 X |
| 3,655,503 | 4/1972 | Stanley et al. | 229/48 TX |
| 3,949,135 | 4/1976 | Vercauteren | 428/500 X |
| 4,098,406 | 4/1978 | Otten et al. | 428/516 X |

OTHER PUBLICATIONS

*The American College Dictionary;* N.Y., Random, 1970., p. 128.

Primary Examiner—George F. Lesmes
Assistant Examiner—R. E. Varndell
Attorney, Agent, or Firm—Corwin R. Horton; Stanley M. Teigland

[57] ABSTRACT

Flexible packaging films of high density polyethylene capable of forming easily openable heatseals can be made by coextruding a layer of the high density polyethylene adjacent to a layer of a blend of an ionomer and a copolymer of ethylene and vinyl acetate or an ester of acrylic and or methacrylic acid. Packages made from the films by forming a blend-to-blend heatseal can be opened by a force between one and five pounds per inch width.

9 Claims, No Drawings

FLEXIBLE PACKAGING FILMS OF HIGH DENSITY POLYETHYLENE CAPABLE OF FORMING EASILY OPENABLE HEATSEALS

BACKGROUND OF THE INVENTION

A common method of packaging products involves forming a single sheet of film into a pouch having an open end, filling the pouch with the product through the open end, and then heat sealing the open end. This method is especially popular in packaging food products, particularly potato chips and other snack foods and cereals. The packaging film normally has at least two layers: a base layer which provides the desired barrier properties and a heatseal layer. High density polyethylene (HDPE) is particularly suitable for forming the base layer because of its excellent moisture barrier properties. However, HDPE has a relatively low melting point (about 270° to 275° F.), which limits the materials that may be used as the heatseal layer.

Normally, the heatseal is formed by fusing opposing sections of the heatseal layer together by the application of heat and pressure. The standard procedure in the industry is to apply a pressure of about 20 psi for one second. The amount of heat applied is that which is sufficient to fuse the heatseal layers together without affecting the base layer. Therefore, the fusion temperature of the heatseal layer must be less than the heat distortion temperature of the base layer, which for HDPE is about 250° F.

The strength of the heatseal must be great enough so that the package is able to withstand normal handling without opening before actual use. It has been found that this heatseal strength must be greater than about one pound per inch width (PIW), and preferably is greater than about 1.5 PIW. On the other hand, the strength of the heatseal must not be so great that the package is difficult to open by the consumer. To be easily opened, the heatseal should have a heatseal strength of less than about 5 PIW, preferably less than 3 PIW.

Opening of the heatseal involves rupture of the heatseal layer followed by delamination of the heatseal layer from the base layer, as shown in U.S. Pat. No. 3,655,503. The force required to rupture the heatseal layer is referred to as the "peak strength"; and the force required to delaminate the heatseal layer from the base layer is referred to as the "peel strength". The peak strength is usually greater than the peel strength. The peak strength depends on the tensile strength of the material forming the heatseal layer and the thickness of the heatseal layer. Consequently, since the peak strength is normally greater than the peel strength, and therefore usually determines the heatseal strength, one might attempt to form an easily openable package (i.e. one having a heatseal strength of less than 5 PIW) by employing an especially thin heatseal layer. However, it has been found that in order to form a satisfactory heatseal, the heatseal layer must be at least 0.25 mil thick because in actual use the surface of the heatseal layer becomes contaminated by particles (e.g. cereal dust) picked up from the product when it is packaged. Thus, the heatseal layer must be at least about 0.25 mil thick in order to flow around the particles and thereby prevent them from interfering with formation of the heatseal. On the other hand, the heatseal layer must be thin enough (generally less than about 0.75 mil thick) so that after the heatsealing operation it cools quickly enough so that the seal sets before the weight of the product acting against the interior walls of the package has a chance to force open the seal. Similarly, the heatseal layer must have sufficient tack strength at the fusion temperature to hold the seal closed until it has set.

Another requirement of the material forming the heatseal layer is that it must be coextrudable with the base layer to form the packaging film.

Consequently, in a packaging film comprising a heatseal layer laminated to a base layer of HDPE, the heatseal layer must meet the following critical specifications: (1) it must have a fusion temperature of less than about 240° F., (2) at a thickness between 0.25 mil and 0.75 mil, it must form a heatseal bond greater than about 1 lb/inch width and less than about 5 lbs/inch width when a pressure of about 20 psi is applied for one second at a temperature above the fusion temperature, (3) it must have sufficient hot tack strength at the fusion temperature to prevent the seal from opening as it cools after the heatsealing operation, and (4) it must be coextrudable with the base layer. Because of the excellent moisture barrier properties of HDPE, there has long been a need for a packaging film comprising a base layer of HDPE laminated to a heatseal layer meeting these specifications, but as far as is known, no such film was ever developed prior to this invention.

SUMMARY OF THE INVENTION

This invention provides a packaging film comprising a base layer of HDPE (i.e. polyethylene having a density greater than 0.940) adjacent to a heatseal layer meeting the specifications outlined above. When opposing sections of the heatseal layer are fused together by the application of a pressure of 20 psi for one second at a film temperature of less than 245° F., a seal is formed which cannot be opened by the application of a force of one PIW or less but which can be opened by the application of a force between 1 and 5 PIW. The heatseal layer has sufficient tack strength at the temperature of fusion that the seal remains closed as it cools after fusion when the package formed from the film is filled to its normal capacity with product.

The heatseal layer is a physical blend of an ionomer with a copolymer of ethylene and a comonomer selected from the group consisting of vinyl acetate, methyl acrylate, ethyl acrylate, methyl methacrylate, and ethyl methacrylate. The comonomer content of the copolymer is preferably between 10 and 30 mole percent. The comonomer is preferably vinyl acetate or ethyl methacrylate. The vinyl acetate copolymer provides better heatseal properties, but the ethyl methacrylate copolymer has a less objectionable odor. The ionomer is a copolymer of an olefin and an ethylenically unsaturated monocarboxylic acid wherein at least 10% of the carboxylic acid groups are neutralized by an alkali metal ion (preferably sodium). The olefin has the formula $RCH=CH_2$ where R is hydrogen or an alkyl group having up to 8 carbon atoms, but the olefin is preferably ethylene. The carboxylic acid is preferably acrylic acid or methacrylic acid. The proportion of ethylene units in the ionomer is at least 50, preferably at least 80 mole percent. The proportion of acid units is preferably from 1 to 20 mole percent. Suitable ionomers are described in U.S. Pat. No. 3,355,319, except that the metal ion must have an ionized valence of one for use in this invention. Suitable blends cannot be prepared from ionomers in which the metal ion has a valence greater than one because the heatseal provided by such blends cannot be opened by a force of less than 5 PIW.

The ratio of the copolymer to the ionomer in the blend is from about 40:60 to about 80:20. At lower ratios, the heatseal is too weak (i.e. less than about one PIW). In fact, even though the copolymer provides a stronger heatseal than the ionomer, the blending of increasing amounts of the copolymer with the ionomer decreases rather than increases the heatseal strength until the ratio of the copolymer to the ionomer approaches 40:60. At ratios above about 80:20, the heatseal is too strong (i.e. above about five PIW). In the range in which the ratio is from 40:60 to about 80:20, the peak strength is greater than the peel strength, and therefore determines the heatseal strength. However, the peel strength is also important because a package made from a flexible film has a back seam which would delaminate when the package is opened if the peel strength of the film were not strong enough. The peel strength of the films of this invention is at least 0.3 PIW, which is sufficient to prevent delamination of the back seam.

In preferred embodiments, the ratio of the copolymer to the ionomer is from about 50:50 to 70:30; and the heatseal strength is from about 1.5 to 3.0 PIW.

The thickness of the heatseal layer is between 0.25 and 0.75 mil. The thickness of the base layer must be at least 0.5 mil in order to be stronger than the heatseal layer; but as far as the principle of this invention is concerned, there is no upper limit to the thickness of the base layer since the thickness of the base layer does not affect the strength of the heatseal as long as the base layer is stronger than the heatseal layer. However, for most packaging applications, the thickness of the base layer is preferably between one and three mils.

One of the important advantages of this invention is that an excellent packaging film can be made having only two layers. However, if desired, the film can include one or more other layers on the other side of the HDPE base layer. For example, to improve the slip characteristics of the film, the film can have a skin layer of polypropylene laminated to the other side of the HDPE. Similarly, the film may also include a layer of a polymer which provides other barrier properties.

The films of this invention are prepared by coextrusion, and may be either cast or blown. Accordingly, the melt index of the blend should be fairly close to the melt index of the HDPE, say within a factor of two. For preparing blown film, the melt index of the HDPE is preferably between 0.5 and 1.0; and for preparing cast film, between 2.5 and 5.

Conventional polymer additives, such as slip additives and antiblock agents, may be added to the resins in their usual amounts.

The films of this invention have a tack strength at the temperature at which the heatseal is formed which is sufficient to hold the seal closed, without application of pressure to hold the seal closed, until the seal has cooled. In preferred embodiments, the tack strength is at least 25 grams per inch.

The film temperature at which the heatseal is formed is preferably from about 170° to 240° F.

EXAMPLES 1-6 AND COMPARATIVE EXAMPLES A-D

Blown coextruded films having a base layer of HDPE and a heatseal layer of a blend of an ionomer and an ethylene-vinyl acetate copolymer were prepared by conventional methods. The HDPE had a density of 0.960. The vinyl acetate content of the copolymer was 18 mole percent. The ionomer was a copolymer of ethylene and 12 mole percent methacrylic acid wherein 10 to 15 percent of the acid groups were neutralized by sodium ions. The melt indices of the HDPE, EVA and ionomer were all 0.7. The thickness of the films was about 2 mils. A blend-to-blend heatseal was formed by the application of a pressure of 20 psi for one second at a film temperature of 220° F. The properties of the films are reported in Table I.

Table I

| Example | Thickness of Heatseal Layer, mil | EVA: Ionomer Ratio | Peak Strength PIW | Peel Strength, PIW | Tack Strength at 220° F., g/in |
|---|---|---|---|---|---|
| A | 0.35 | 0:100 | 0.33 | 0.10 | 350-375 |
| B | 0.35 | 25:75 | 0.30 | 0.15 | 150-175 |
| 1 | 0.35 | 50:50 | 1.45 | 0.38 | 50-75 |
| 2 | 0.35 | 60:40 | 1.74 | 0.63 | 25-50 |
| 3 | 0.60 | 60:40 | 2.57 | 1.12 | 50-75 |
| 4 | 0.35 | 70:30 | 2.12 | 0.72 | 25-50 |
| 5 | 0.60 | 70:30 | 2.67 | 1.35 | 25-50 |
| 6 | 0.35 | 80:20 | 4.6 | 4.6 | 0-25 |
| C | 0.35 | 100:0 | 6.5* | * | 0-25 |
| D | 0.60 | 100:0 | 8.5* | * | 25-50 |

*Film Broke

EXAMPLE 7

A cast coextruded film having a layer of HDPE sandwiched between a skin layer of polypropylene and a heatseal layer of a 50:50 blend of an ionomer and a copolymer of ethylene and 18 mole percent vinyl acetate was prepared by conventional methods. The ionomer was a copolymer of ethylene and 12 mole percent methacrylic acid wherein 10 to 15 percent of the acid groups were neutralized by sodium ions. The melt indices of the polypropylene, HDPE, EVA and ionomer resins were 4, 6, 3 and 3, respectively. The thicknesses of the polypropylene, HDPE, and heatseal layers were 0.1, 1.8 and 0.35 mil, respectively. A blend-to-blend heatseal formed as in the preceding examples had a peak strength of 2.7 PIW and a peel strength of 2.1 PIW.

EXAMPLE 8

A cast coextruded film having a layer of HDPE and a heatseal layer of a 40:60 blend of a copolymer of ethylene and 17 mole percent ethyl methacrylate and a ionomer was prepared by conventional methods. The ionomer was a copolymer of ethylene and 12 mole percent methacrylic acid wherein 10 to 15 percent of the acid groups were neutralized by sodium ions. The thickness of the heatseal layer was about 0.35 mil and the overall thickness of the film was about 2.2 mils. A blend-to-blend heatseal was formed by the application of a pressure of 20 psi for one second at a film temperature of 240° F. The film had a peak strength of 1.0 PIW and a peel strength of 0.3 PIW.

EXAMPLE 9

Example 8 was repeated using a 45:55 blend of the copolymer and the ionomer. The film had a peak strength of 1.3 PIW and a peel strength of 0.3 PIW.

I claim:
1. A flexible packaging film comprising a
base layer consisting essentially of high density polyethylene, and a heatseal layer having a thickness between about 0.25 and 0.75 mil and consisting essentially of a physical blend of a first and second copolymer, the first copolymer being a copolymer of ethylene and a comonomer selected from the group consisting of vinyl acetate, methyl acrylate, ethyl acrylate, methyl methacrylate, and ethyl methacrylate, the comonomer content being between 10 and 30 mole percent, the second copolymer in the blend being an ionomer which is a copolymer of at least 50 mole percent of an olefin having up to 9 carbon atoms and an ethylenically unsaturated monocarboxylic acid wherein at least 10% of the carboxylic acid groups are neutralized by an alkali metal ion, the ratio of the first copolymer to the second copolymer (ionomer) being between 40:60 and 80:20, the film being formed by coextruding the base layer and the heatseal layer adjacent to each other, the film being capable of forming a blend-to-blend heatseal by the application of a pressure of 20 psi for one second at a film temperature of less than 245° F., which heatseal is openable by rupture of the heatseal layer and delamination between the base layer and the heatseal layer by the application of a force between one and five pounds per inch width, but not openable by the application of a force of one pound per inch width or less, the heatseal having a peel strength of at least 0.3 pounds per inch width, the heatseal layer having a tack strength at a temperature at which a heatseal can be formed which is sufficient to maintain the seal without application of pressure until the seal has cooled.

2. The film of claim 1 wherein the comonomer is vinyl acetate.

3. The film of claim 1 wherein the comonomer is ethyl methacrylate.

4. The film of claim 1 wherein the tack strength is at least 25 grams per inch.

5. The film of claim 4 wherein the ionomer is a copolymer of at least 80 mole percent ethylene and wherein the alkali metal is sodium.

6. The film of claim 5 wherein the ratio of the copolymer to the ionomer is from 50:50 to 70:30.

7. The film of claim 6 wherein the heatseal is openable by a force between 1.5 and 3.0 pounds per inch width.

8. The film of claim 7 wherein the thickness of the base layer is between one and three mils.

9. The film of claim 8 wherein the base layer and the heatseal layer are the only layers of the film.

* * * * *